United States Patent
Doremus et al.

(10) Patent No.: US 6,907,975 B2
(45) Date of Patent: Jun. 21, 2005

(54) CLUTCH, IN PARTICULAR FOR MOTOR VEHICLE, WITH PNEUMATIC CONTROL

(75) Inventors: Olivier Doremus, Izel Lez Hameau (FR); Rémi Trouyet, Dommartin (FR)

(73) Assignee: Valeo Embrayages, Amiens (FR)

( * ) Notice: Subject to any disclaimer, the term of this patent is extended or adjusted under 35 U.S.C. 154(b) by 0 days.

(21) Appl. No.: 10/450,910

(22) PCT Filed: Oct. 2, 2002

(86) PCT No.: PCT/FR02/03345

§ 371 (c)(1),
(2), (4) Date: Jun. 19, 2003

(87) PCT Pub. No.: WO03/031838

PCT Pub. Date: Apr. 17, 2003

(65) Prior Publication Data

US 2004/0055849 A1 Mar. 25, 2004

(30) Foreign Application Priority Data

Oct. 8, 2001 (FR) .............................. 01 12917

(51) Int. Cl.⁷ .................... F16D 25/08; F16D 48/06
(52) U.S. Cl. .................... 192/91 A; 192/70.25; 192/86; 192/109 F
(58) Field of Search ................. 192/70.25, 86, 192/85 C, 85 CA, 91 R, 91 A, 109 F, 109 A, 89.23, 89.24; 91/210, 196; 92/117 A, 134, 132

(56) References Cited

U.S. PATENT DOCUMENTS

| 2,739,679 A | * | 3/1956 | Randol | 192/109 F |
| 3,131,796 A | * | 5/1964 | Youngs, III | 192/85 CA |
| 3,165,891 A | * | 1/1965 | Smirl et al. | 92/132 |
| 3,379,291 A | * | 4/1968 | Randol | 192/91 R |
| 4,003,547 A | * | 1/1977 | Snyder et al. | 92/134 |
| 4,234,066 A | * | 11/1980 | Toyota et al. | 192/91 R |
| 4,860,868 A | | 8/1989 | Murakami | |
| 4,889,217 A | * | 12/1989 | Janiszewski et al. | 192/85 C |
| 4,926,994 A | * | 5/1990 | Koshizawa et al. | 192/85 C |
| 5,042,631 A | * | 8/1991 | Ellenberger et al. | 192/85 C |
| 5,088,584 A | * | 2/1992 | Inaba et al. | 192/89.24 |
| 5,456,344 A | * | 10/1995 | Nellums | 192/91 A |
| 6,116,399 A | | 9/2000 | Drexl et al. | |
| 6,167,995 B1 | * | 1/2001 | Lindner | 192/91 A |
| 6,397,998 B1 | * | 6/2002 | Wheeler et al. | 192/85 CA |

FOREIGN PATENT DOCUMENTS

| EP | EP 0 356 285 A | 2/1990 |
| WO | WO 03/019026 | 3/2003 |

* cited by examiner

*Primary Examiner*—Rodney H. Bonck
(74) *Attorney, Agent, or Firm*—Liniak, Berenato & White, LLC

(57) ABSTRACT

A clutch for a motor vehicle having an annular diaphragm (54) with a concave clutch characteristic curve and a pneumatic actuator (76) acting on the diaphragm (54) for clutch release. A mechanism (86, 88) is provided to generate a supplemental resistant force during clutch release to that developed by the diaphragm (54). The invention is particularly applicable to industrial vehicles equipped with a pressurized gas source.

26 Claims, 12 Drawing Sheets

CLUTCH, IN PARTICULAR FOR MOTOR VEHICLE, WITH PNEUMATIC CONTROL

The present invention relates to a clutch, in particular for a motor vehicle, of the pneumatically-controlled type and comprising clutch-engaging means suitable for exerting an axial force for engaging the clutch on a friction disc fixed rotation-wise to a driven shaft.

The friction disc is gripped between a reaction plate driven rotation-wise by a drive shaft, such as for example the crankshaft of an internal combustion engine, and a pressure plate movable in axial translational motion with respect to the reaction plate and on which an axial pushing force is exerted by the clutch-engaging means, which are formed by helical springs or an annular diaphragm carried by a cover fixed to the reaction plate. The diaphragm comprises a radially external annular part, forming a Belleville washer resting on the pressure plate, and radial fingers extending towards the axis of rotation of the clutch from the Belleville washer. A clutch release bearing axially movable in translational motion on a fixed support, such as a guide tube in which the driven shaft extends, rests on the free end of the fingers of the diaphragm in order to make it switch into a clutch-disengaging position, when it is itself moved axially by a control.

Traditionally, this control comprises a fork mounted so as to pivot about a fixed transverse axis and connecting means, for example cable-based, linking the fork to a clutch pedal.

The use has already been proposed for this control of a pneumatic actuator, in particular when the clutch is intended for an industrial vehicle whose brake circuit is pneumatically controlled and which is already equipped with a source of pressurised gas (generally air). However, such a pneumatic control is possible only in the case where the clutch-engaging means have a characteristic clutch-disengaging load curve which is of a not very concave type, that is to say where the clutch-disengaging load remains substantially constant or decreases little during disengaging of the clutch, this characteristic being determined in the case of an annular diaphragm by the ratio H/e, H being the axial dimension of the truncated cone of the Belleville washer in the free state and e the thickness of the sheet metal of the diaphragm. When the concavity of the characteristic curve is greater, the axial load developed by the clutch-engaging means at the release bearing decreases during disengaging of the clutch more quickly than the force exerted by a single-acting pneumatic actuator, in which the decrease in the exerted effort is due to the expansion of the gas in a closed chamber. This difference makes it impossible to hold a stable intermediate position of the clutch-disengaging means, which automatically switch to a complete clutch-disengaging position.

The current tendency is however to use clutch-disengaging means having a concave or highly concave characteristic curve, which allows the transmission of higher rotation torques whilst limiting the clutch-disengaging effort and which makes it possible in addition to increase the wear travel of the mechanism and lengthens the service life of the clutch.

The aim of the invention is in particular to provide a simple, effective and economical solution to this problem.

Its object is a clutch of the type described above, comprising clutch-engaging means with a concave characteristic curve and which can be controlled at disengaging of the clutch by a pneumatic actuating device.

To that end it proposes a clutch, in particular for a motor vehicle, comprising clutch-engaging means suitable for exerting an axial force for engaging the clutch on a friction disc fixed rotation-wise to a driven shaft, and clutch-disengaging means comprising a pneumatic actuating device supplied with pressurised gas for exerting on the clutch-engaging means a clutch-disengaging force at least equal to a resisting force developed by these clutch-engaging means, characterised in that it also comprises means developing, during disengaging of the clutch, a second resisting force opposite to the clutch-disengaging force and being added to the resisting force developed by the clutch-engaging means.

Thus, when the clutch-engaging means have a concave characteristic curve, the second resisting force produced according to the invention compensates at least partly for the decrease in the load developed by the clutch-engaging means and makes it possible to return to the case cited above of a characteristic curve which is not, or not very, concave which can be controlled at disengaging of the clutch by a pneumatic actuator.

Said second resisting force can be produced by at least one spring or the like or, in a variant, by compression of gas in a chamber.

Advantageously, the clutch according to the invention comprises means of controlling this second resisting force.

This control makes it possible for example to give the resultant of the two resisting forces a value which is substantially constant over a second part of the clutch-disengaging travel.

In practice, as the position stability defect mentioned above is due to the reduction in the force developed by the clutch-engaging means, which decreases more than the force exerted by the pneumatic actuator, it is sufficient in order to correct this defect that the resultant of the force developed by the clutch-engaging means and said second resisting force does not decrease more quickly than the force exerted by the pneumatic actuator. In other words, it is not necessary for the aforementioned resultant to be substantially constant or increasing with the clutch-disengaging travel and this resultant can be decreasing and correspond to a not very concave characteristic curve.

In a preferred embodiment of the invention, the actuating device comprises a cylinder, a piston mounted so as to slide in this cylinder and delimiting therein a first chamber, a supply of pressurised gas opening into the first chamber, means of connecting the piston or the cylinder to the clutch-disengaging means, means of connecting the cylinder, or the piston respectively, to a fixed support, and a second chamber delimited in the cylinder by the piston, the means developing said second resisting force being housed in one of the two chambers.

Preferably, the actuating device is axially aligned with the clutch-disengaging means and is mounted between these means and a fixed support.

Of course, the invention is applicable to both clutches of the push type and those of the pull type.

The invention will be better understood, and other characteristics, details and advantages thereof will emerge more clearly from a reading of the following description, given by way of example with reference to the accompanying drawings in which.

Figure 1:
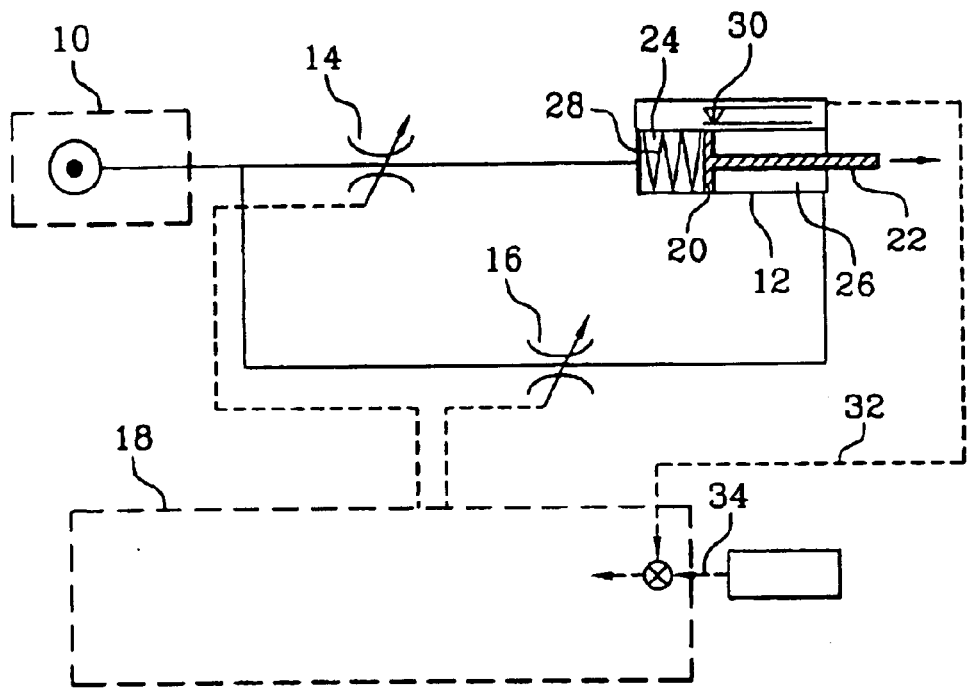
FIG. 1 depicts schematically a clutch control circuit according to the invention.

In the diagram of FIG. 1, the reference 10 designates a source of pressurised gas, in particular air, which supplies a double-acting pneumatic actuator 12 by means of solenoid valves 14, 16 (one or two solenoid valves per chamber) controlled by an electronic module 18 or by information processing means. The actuator 12 comprises a piston 20 connected to a piston rod 22 which extends inside the cylinder of the actuator 12 for actuating the clutch-disengaging means of a vehicle clutch, the piston 20 delimiting inside the cylinder of the actuator 12 two chambers 24, 26, the first of which is supplied by the solenoid valve or valves 14 and contains a return spring 28, and the second 26 of which is supplied by the solenoid valve or valves 16.

A position sensor 30 is associated with the piston 20 of the pneumatic actuator 12 and transmits to the module 18 a piston position signal 32 which is compared with a set point signal 34 at the input of the module 18.

Figure 2:
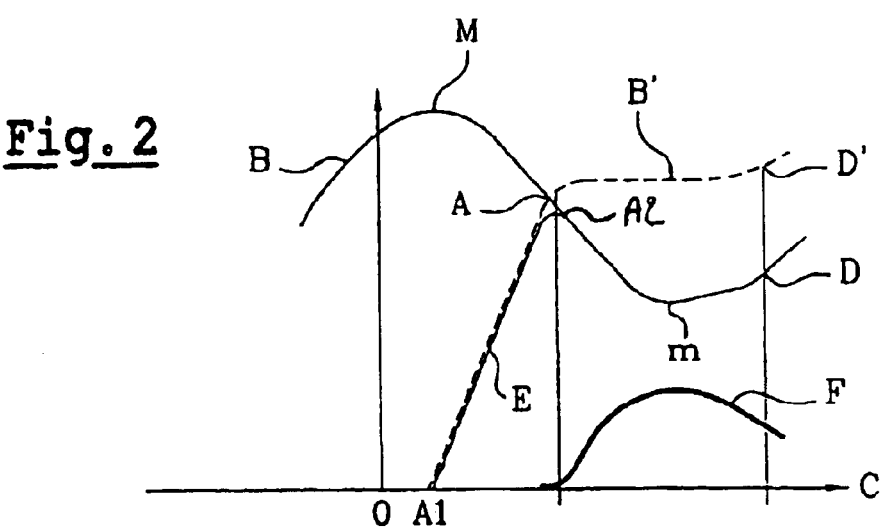
FIG. 2 is a graph depicting the variation in the clutch-disengaging load as a function of the clutch-disengaging travel in a clutch according to the invention.

When the clutch-engaging means are constituted by an annular diaphragm, the radially external part of which is formed of a Belleville washer suitable for exerting a clutch-engaging force on a friction disc, and the radially internal part of which is formed of radial fingers extending towards the axis of rotation and cooperating with a clutch release bearing or with another operating element, the variation in the load exerted by this diaphragm on the clutch release bearing or on the operating element as a function of the clutch-disengaging travel c is depicted by the curve B in FIG. 2. The curve E depicts the variation in the effort it is necessary to apply to the clutch release bearing or to the operating element in order to disengage the clutch.

It can be seen that the clutch-disengaging effort of the curve E increases from a point A1 until reaching at the point A2 a value equal to the resisting effort opposed by the diaphragm, after which the clutch-disengaging effort follows the curve B as far as point D which corresponds to the end of disengaging of the clutch.

As indicated above, when the curve B is concave, that is to say when the difference between its maximum value M and its minimum value m is relatively large, a pneumatic actuator cannot be used for disengaging the clutch owing to the rapid decrease in the resisting effort opposed by the diaphragm from the point A2, this effort becoming less than the effort exerted by the actuator and not allowing a position to be held.

In order to solve this problem, the invention makes provision to add, to the resisting effort developed by the diaphragm, another resisting effort such as the one corresponding to the curve F of FIG. 2, which has for example a shape approximately the inverse of that of the curve B between the points A and D, so that the resultant of these two resisting efforts is substantially constant over the part of the clutch-disengaging travel between A2 and D as indicated by the curve B' in dotted lines.

Under these conditions, the effort it is necessary to apply to the release bearing or to the other operating element for disengaging the clutch is depicted by the curve (A1-A2-D') and can be exerted by a pneumatic actuator.

In the diagram of FIG. 1, the pressure in the chamber 26 of the pneumatic actuator is modulated by the solenoid valve or valves 16 in order to correspond substantially to the curve F of FIG. 2, according to the position of the piston 20 provided by the sensor 30.

Figure 3:
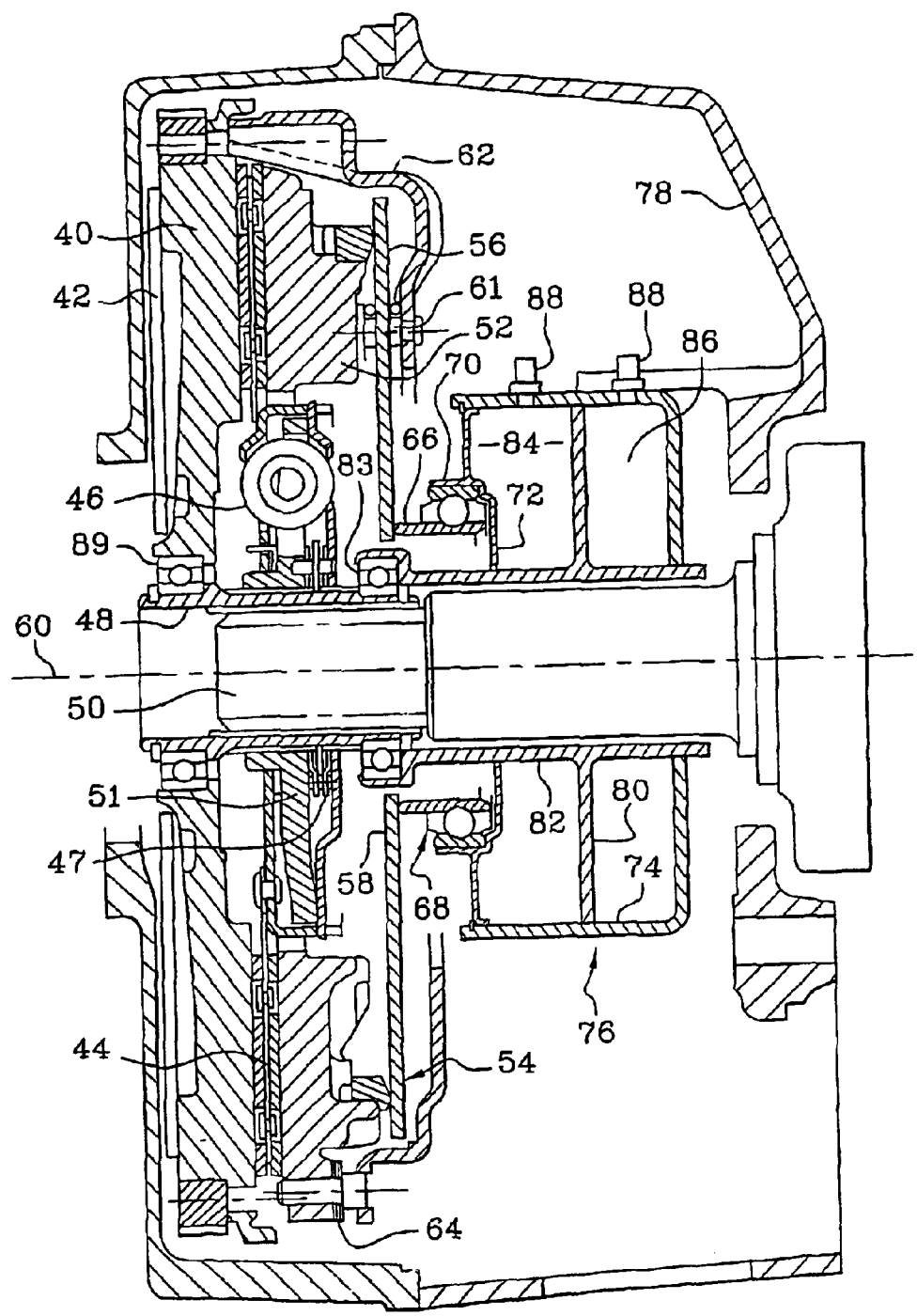
FIGS. 3 and 4 are partial schematic views in axial section of a first embodiment of the invention, in the case of a push-type clutch and a pull-type clutch, respectively.

FIG. 3 depicts schematically one embodiment of a clutch according to the invention, of the push type. This clutch comprises an inertial flywheel 40 mounted by means of a flexible metal sheet 42 on a drive shaft (not depicted) such as the crankshaft of an internal combustion engine, this inertial flywheel 40 forming the reaction plate of a clutch whose friction disc 44 is connected by a torsion damping device 46 to a cylindrical sleeve 48 which forms the output element of the device 46 and which is fixed rotation-wise to a driven shaft 50 such as the input shaft of a transmission.

The friction disc 44 carries friction linings which are gripped axially between the inertial flywheel 40 and a pressure plate 52 by clutch-engaging means such as an annular diaphragm 54, the radially external part of which forms a Belleville washer 56 acting axially on the pressure plate 52 towards the inertial flywheel 40 for gripping the friction disc, and the radially internal part of which is formed of radial fingers 58 extending from the Belleville washer 56 towards the axis of rotation 60 of the clutch. The annular diaphragm 54 is mounted able to tilt on attachment means 61 carried by a clutch cover 62 which is fixed to the inertial flywheel 40 and to which the pressure plate 52 is connected by elastically deformable tabs 64 which provide the rotational driving of the pressure plate 52 by the cover 62 and which allow an axial movement of the pressure plate 52 while exerting thereon a return force towards the cover 62.

The free ends of the radial fingers 58 of the annular diaphragm rest on an internal cylindrical ring 66 of a clutch release bearing 68, the external cylindrical ring 70 of which is fixed to a transverse annular wall 72 forming one end of the cylinder 74 of a clutch-disengaging control pneumatic actuator 76. Advantageously, the release bearing 68 is self-centring and is mounted with a radial clearance in its housing.

The actuator 76 is coaxial with the clutch and is carried by a fixed support 78. In the example depicted, the piston 80 of the actuator 76 is fixed and comprises a tubular central part 82 with the driven shaft 50 passing through it axially with clearance and carrying at one end a bearing 83 for centring a corresponding end of the hub 48. The cylinder 74 is mounted axially so as to slide with respect to the piston 80 and to the fixed support 78. The piston 80 delimits in the cylinder two chambers 84 and 86, each of which is connected by a terminal 88 passing through the cylinder 74 to means of supplying with pressurised gas.

The hub 48 of the torsion damper is centred, at its engine side end, by a bearing 89 on the inertial flywheel 40 and is fixed to this bearing translation-wise, the bearing itself abutting on the flywheel 40 on the side opposite to the engine. It should be noted that the torsion damper 46 comprises a pre-damper 47, an annular element of which is fixed rotation-wise with the hub 48 by longitudinal grooves on the external cylindrical surface of this hub, this pre-damper forming means of connecting rotation-wise a central annular web 51 of the main damper and the hub 48 while absorbing the vibrations and irregularities of rotation during slow running.

It should also be noted that the hub 48 with the roller bearings 83, 89, the actuating device 76, the clutch mechanism comprising the flywheel 40, the friction disc 44, the pressure plate 52, the diaphragm 56 and the cover 61, form a module which can be pre-assembled.

In the clutch-engaged position depicted in FIG. 3, the diaphragm 54 exerts an axial thrust on the pressure plate 52 for gripping the friction linings of the disc 44 between the inertial flywheel 40 and the pressure plate 52, for transmitting a rotational torque from the drive shaft to the driven shaft 50.

For disengaging the clutch, the chamber 84 of the pneumatic actuator 76 is supplied with pressurised gas, which causes a movement of the cylinder 74 and the clutch release bearing 68 towards the inertial flywheel 40. The radially internal ring 66 of the clutch release bearing 68 exerts an axial thrust on the free ends of the radial fingers 58 of the diaphragm 54 and makes this tilt on its means 61 of attachment on the clutch cover 62, which has the effect of allowing the movement of the pressure plate 52 towards the cover 62 under the action of the return tabs 64. The axial movement of the pressure plate 52 causes the release of the friction linings of the disc 44 and interruption of the transmission of a rotational torque from the drive shaft to the driven shaft 50. The effort to which the fixed piston 80 of the actuator is subjected during disengaging of the clutch is transmitted to the flywheel 40 by the bearing 83, the hub 48 and the bearing 89.

By controlling the pressure in the second chamber 86, the value of the resisting force which opposes the movement of the clutch release bearing 68 towards the flywheel 40 and the tilting of the diaphragm 54 is regulated, and the variation in this resisting force over the whole of the clutch-disengaging travel is also regulated, for example as indicated by the curve F of FIG. 2. In particular, by means of feedback control, the variations in this force can be regulated as a function of variables such as the air temperature, the engine temperature and the wear of the friction linings.

When the clutch has been disengaged, controlling the pressure in the chambers 84 and 86 of the pneumatic actuator 76 makes it possible to control the clutch re-engaging travel in accordance with predetermined control laws and as a function also of the conditions of movement of the vehicle and the orders given by the driver.

Figure 4:
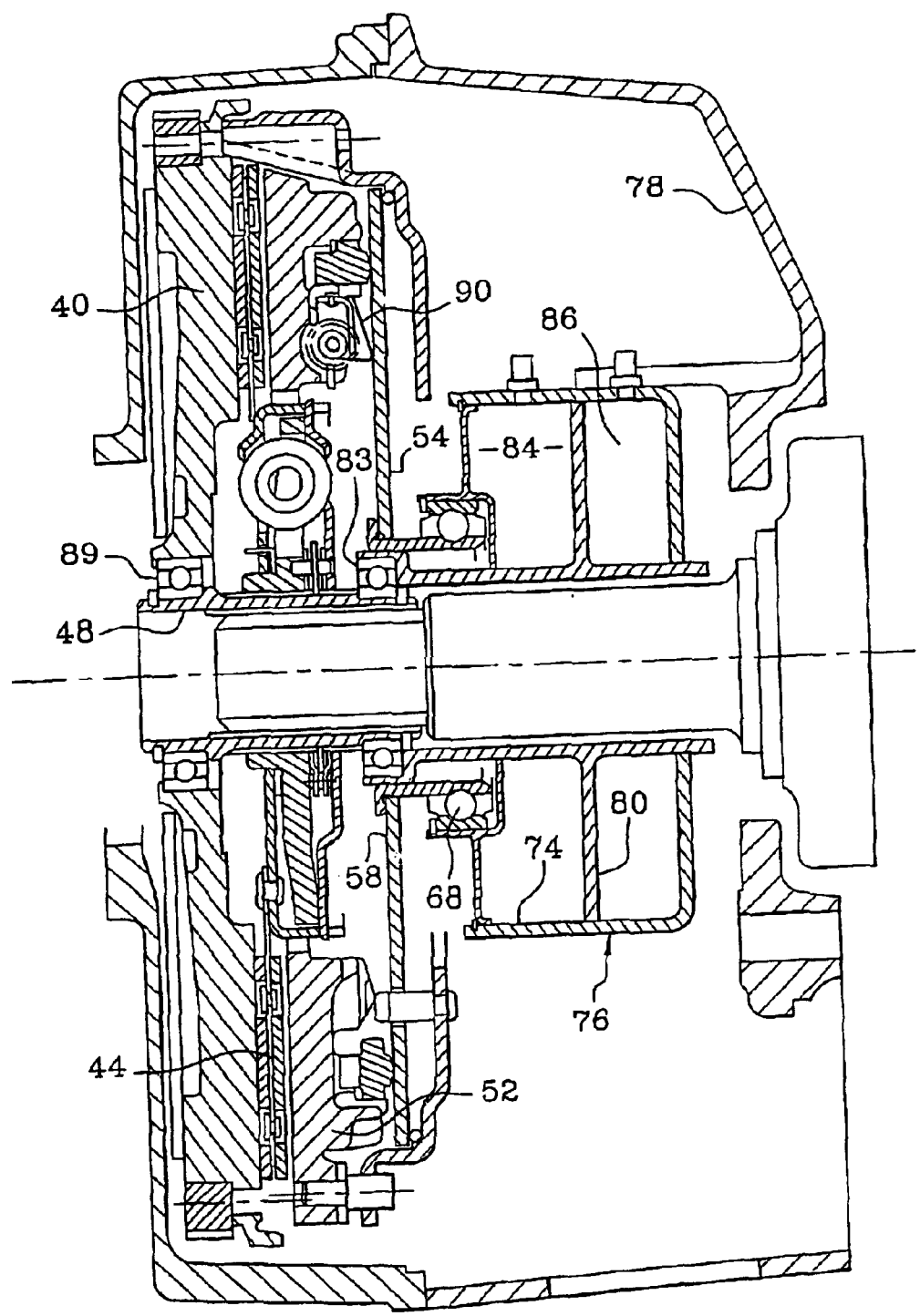

In the variant embodiment depicted in FIG. 4, there is the same pneumatic actuator 76 as in FIG. 3, the main difference being that the clutch is of the pull type, the free ends of the radial fingers 58 of the diaphragm being attached to the clutch release bearing 68 and moved in the direction opposite to the inertial flywheel 40 for disengaging the clutch.

The role of the chambers 84 and 86 of the actuator 76 is therefore reversed. For disengaging the clutch from the engaged position depicted in FIG. 4, pressurised gas is admitted into the chamber 86 in order to move the cylinder 74 with respect to the piston 80 in the direction opposite to the inertial flywheel 40. The pressure in the chamber 84 is modulated in order to generate a resisting force corresponding to the curve F in FIG. 2 and which is added to the resisting force developed by the diaphragm 54.

It should also be noted that the pressure plate 52 carries a mechanism 90 for automatic compensation for the wear of the friction linings carried by the disc 44, this mechanism cooperating with the diaphragm 54, which makes it possible to hold the clutch start and end positions irrespective of the wear of the friction linings and therefore to make the control insensitive to this degree of wear.

The effort to which the fixed piston 80 of the actuator is subjected during disengaging of the clutch is applied to the flywheel 40 by the bearing 83, the means 48 and the bearing 89, the latter abutting on the flywheel 40 on the engine side.

For the remainder, the clutch of FIG. 4 is identical to that described with reference to FIG. 3.

Of course, during disengaging of the clutch, the resisting pressure in the chamber 86 of the clutch of FIG. 3 or in the chamber 84 of the clutch of FIG. 4 can be controlled as wished. These chambers can also be closed so that the pressure in the chamber 86 of the clutch of FIG. 3 or in the chamber 84 of the clutch of FIG. 4 increases progressively during disengaging of the clutch, from the sole fact of the movement of the cylinder 74 with respect to the piston 80.

Figure 5:
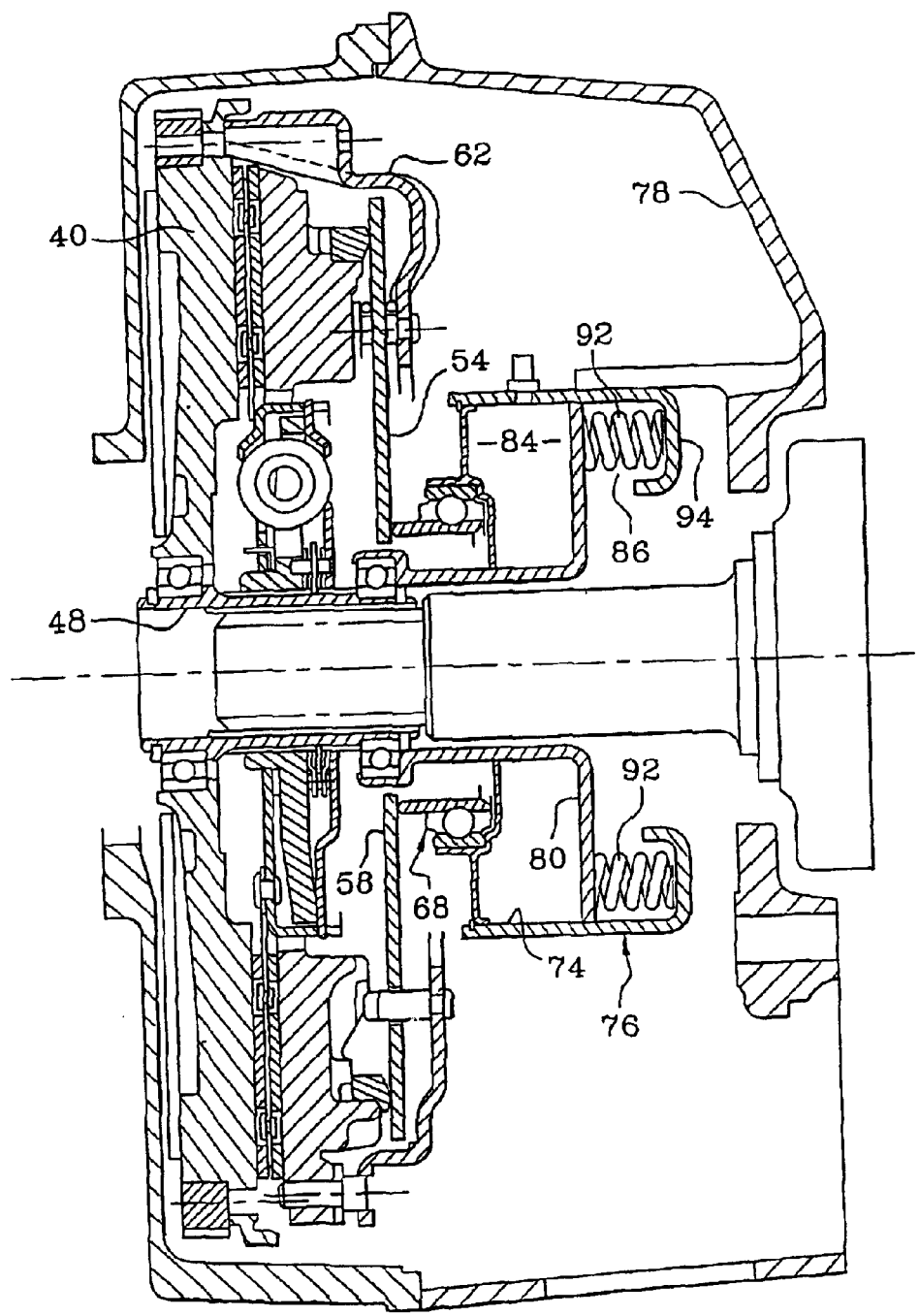
FIGS. 5 and 6 are views corresponding to FIGS. 3 and 4, for another embodiment.
Figure 6:
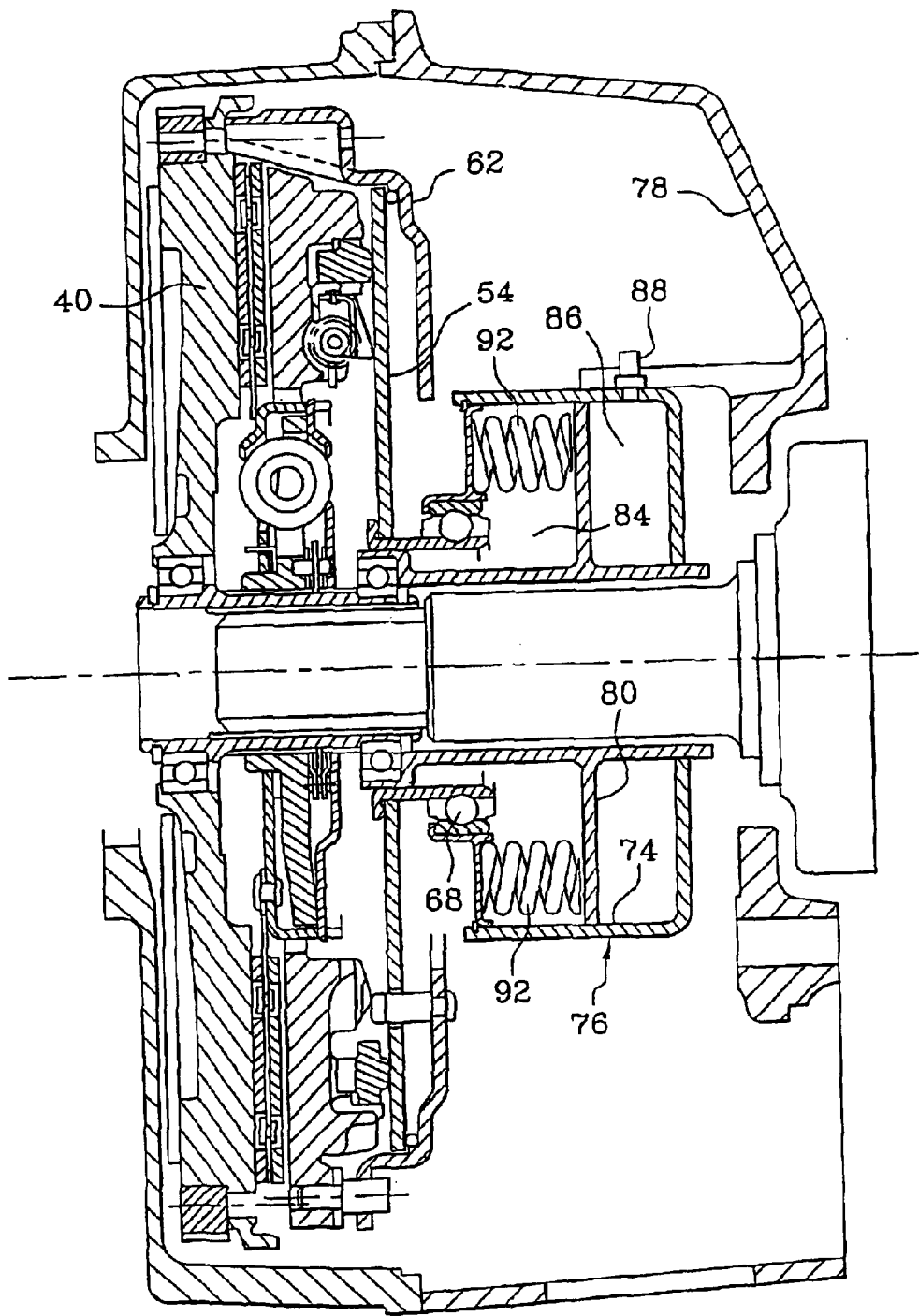

In the variant embodiment of FIGS. 5 and 6, the resisting force which is added to that developed by the diaphragm is produced by compression springs 92 housed in one of the chambers 84, 86 of the pneumatic actuator 76.

The clutch of FIG. 5 is of the push type and the compression springs 92 are located in the chamber 86 situated on the side opposite to the inertial flywheel 40. The other chamber 84 is supplied with pressurised gas for disengaging the clutch in order to move the cylinder 74 and the clutch release bearing 68 towards the inertial flywheel 40 and make the diaphragm 54 tilt about its mounting supports on the cover 62. As can be seen in FIG. 5, the start of the clutch-disengaging travel has no compressive effect on the springs 92, an axial clearance being provided between the end of each spring and the corresponding transverse wall 94 of the cylinder 74, this wall forming a seat for the corresponding ends of the springs. This clutch-disengaging travel with no effect on the compression of the spring corresponds to the part of the curve E of FIG. 2 which starts from zero and ends at the point A2.

The clutch of FIG. 6 is of the pull type and the compression springs 92 are located in the chamber 84 situated on the side of the inertial flywheel 40. The other chamber 86 is supplied with pressurised gas for disengaging the clutch. In the engaged state depicted in the drawings, an axial clearance exists between the ends of the springs 92 and the piston 80 on which these ends of the springs rest during disengaging of the clutch.

In the embodiments of FIGS. 5 and 6, the chambers 86, 84 respectively containing the springs 92 are not closed in a sealed manner, unlike the embodiments of FIGS. 3 and 4.

Figure 7:
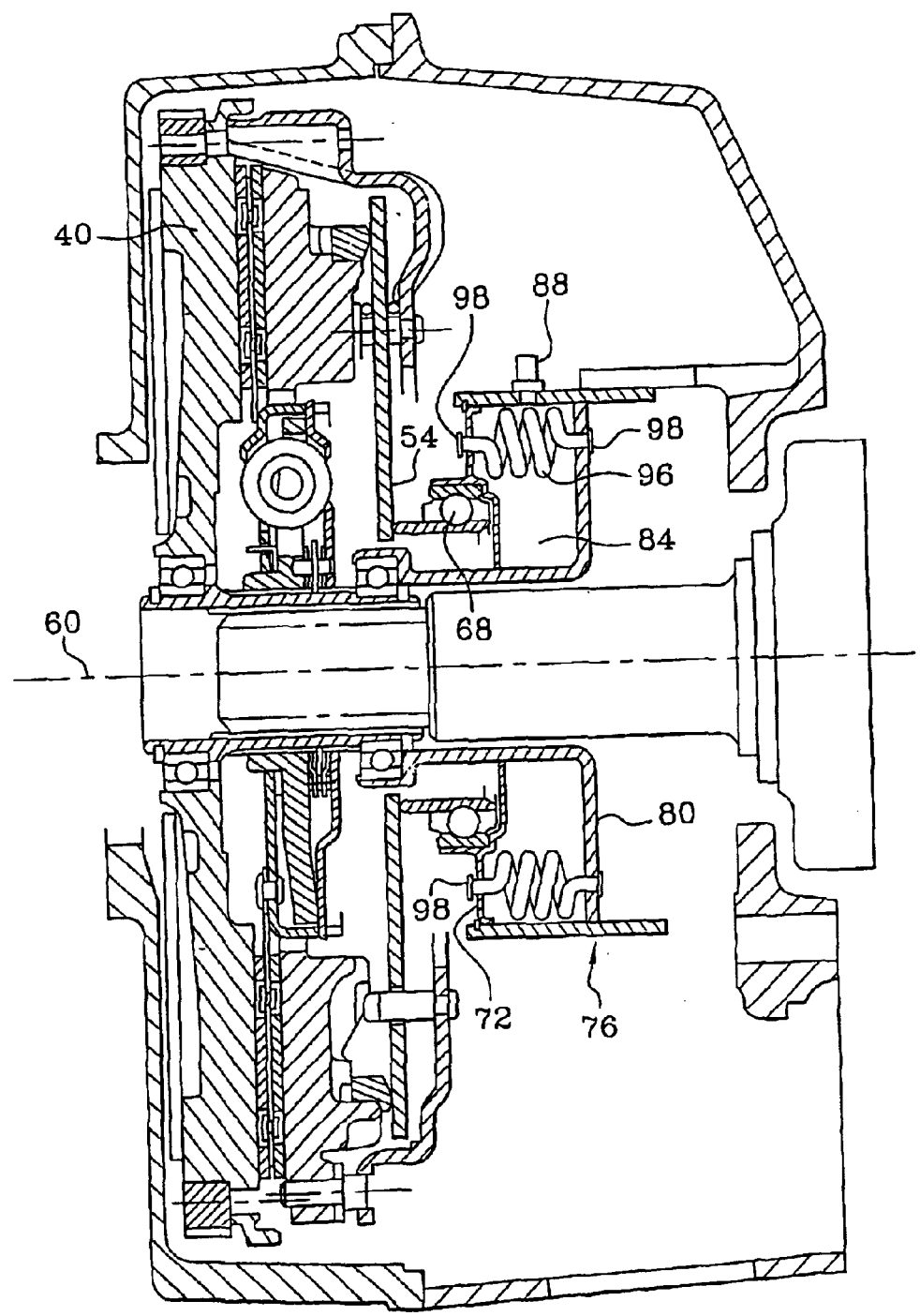
FIGS. 7 and 8 are also views corresponding to FIGS. 3 and 4, for yet another embodiment of the invention.
Figure 8:
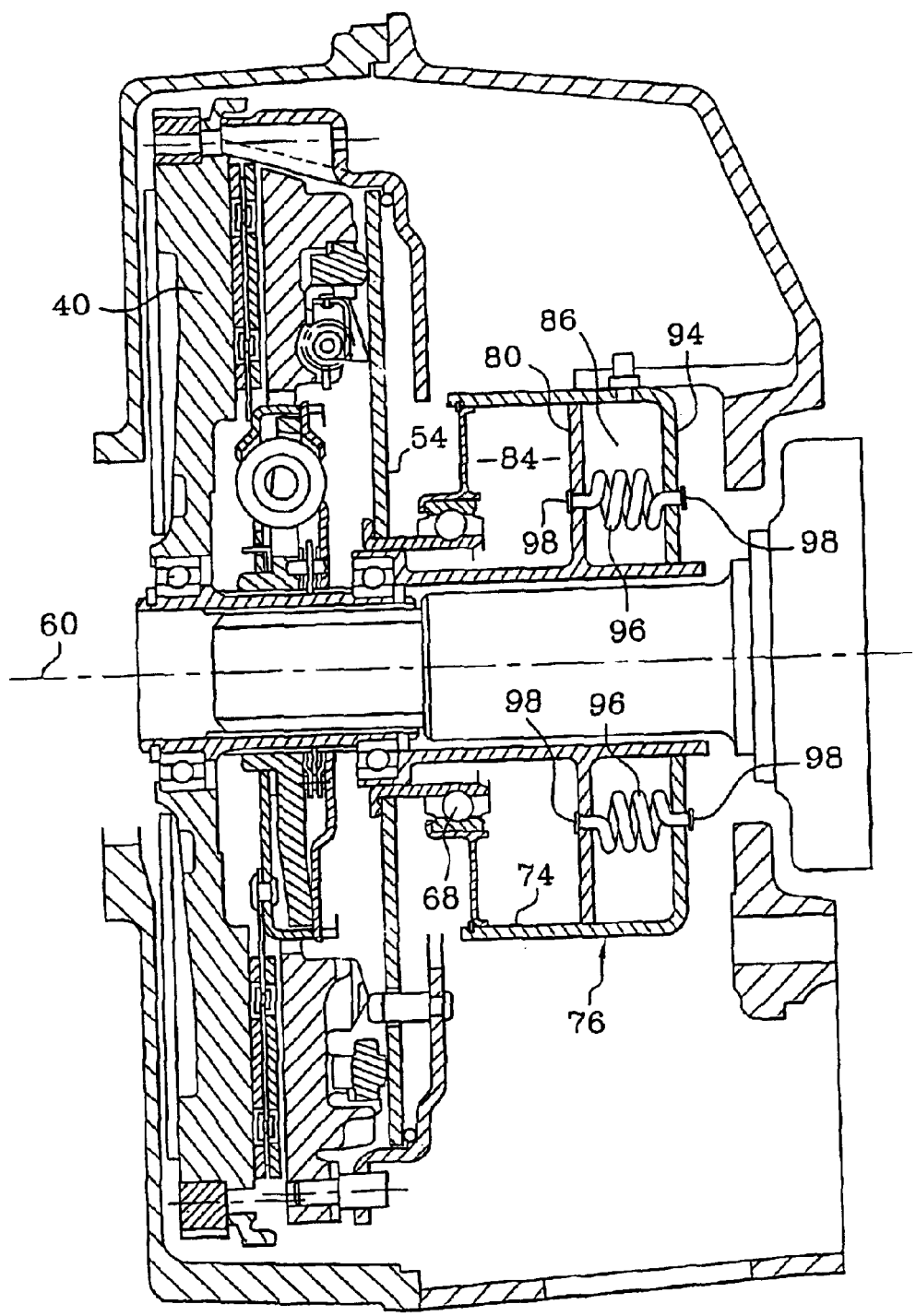

In the embodiments of FIGS. 7 and 8, the resisting force which is added to that developed by the diaphragm during disengaging of the clutch is produced by draw springs 96 which extend parallel to the axis of rotation 60 and which are housed in that one of the chambers 84, 86 of the pneumatic actuator 76 which is supplied with pressurised gas.

The ends of the springs 96 are attached or fixed in one way or another to the piston 80 and to an end wall of the cylinder 74, with an axial clearance so that the start of the clutch-disengaging travel brings about no lengthening of the springs 96.

In the example depicted, the ends of the springs 96 extend into holes in the pistons 80 and the end walls 72, 94 respectively of the cylinder 74 and are widened or deformed as indicated at 98 in order to cause a lengthening of the springs 96 during disengaging of the clutch.

Figure 9:
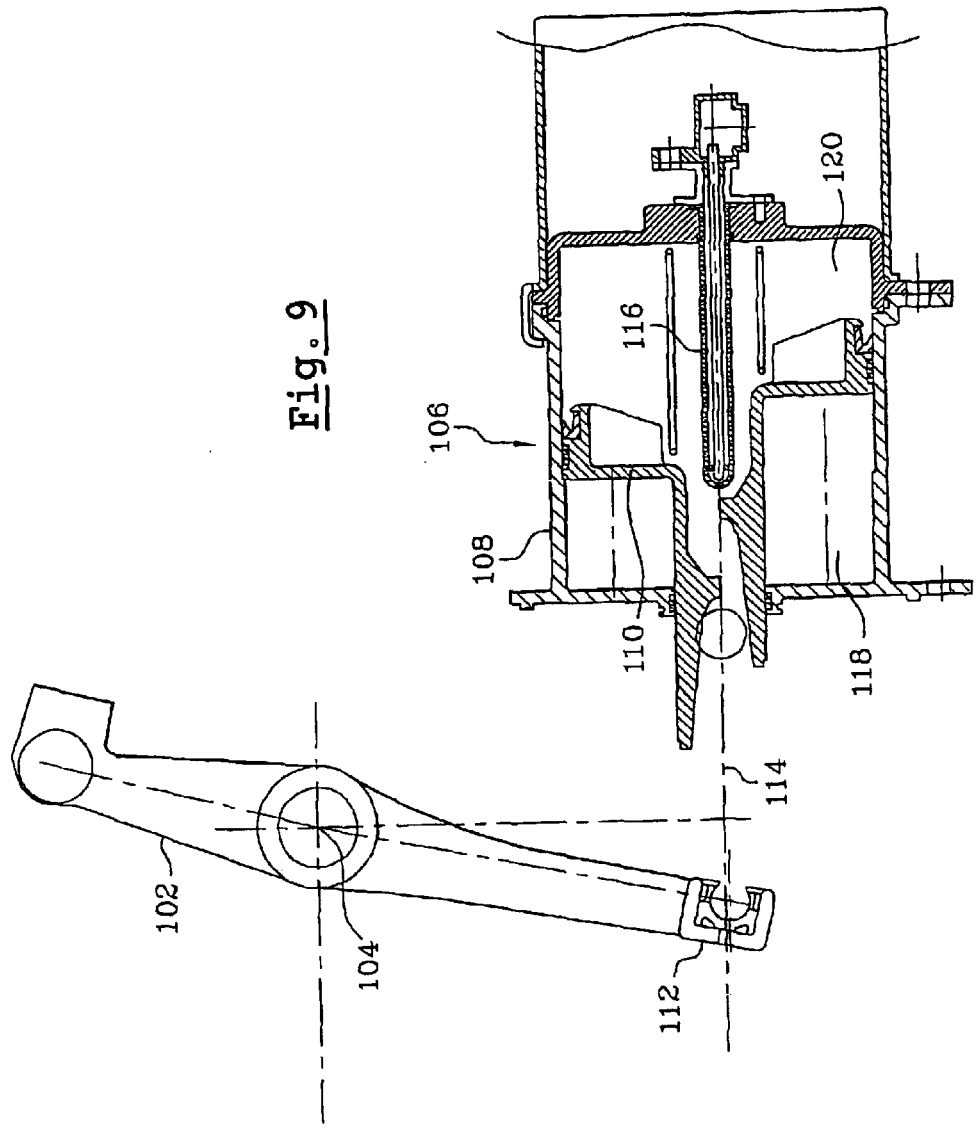
FIGS. 9 to 14 are schematic views of other embodiments of the invention.
Figure 10:
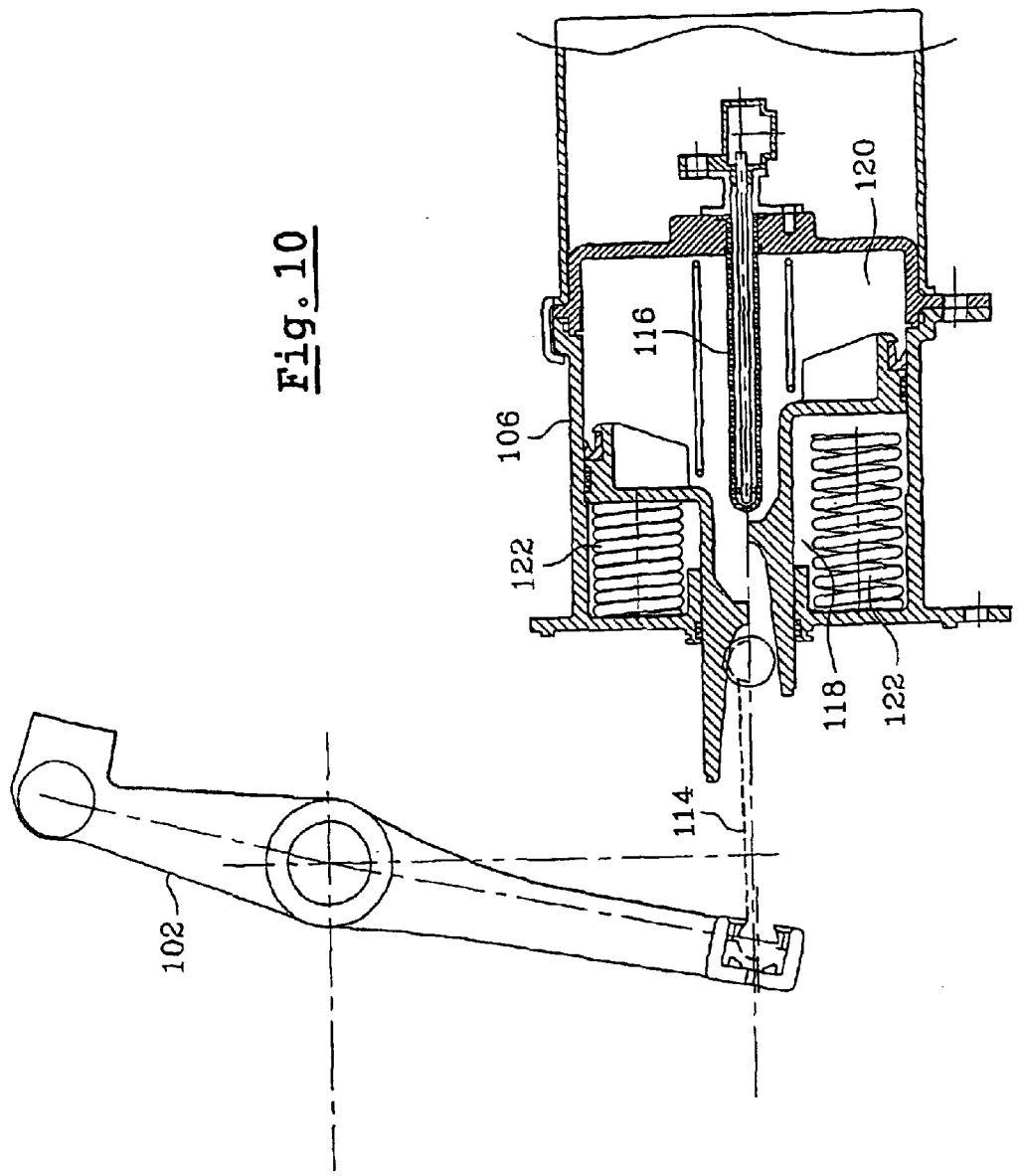
Figure 11:
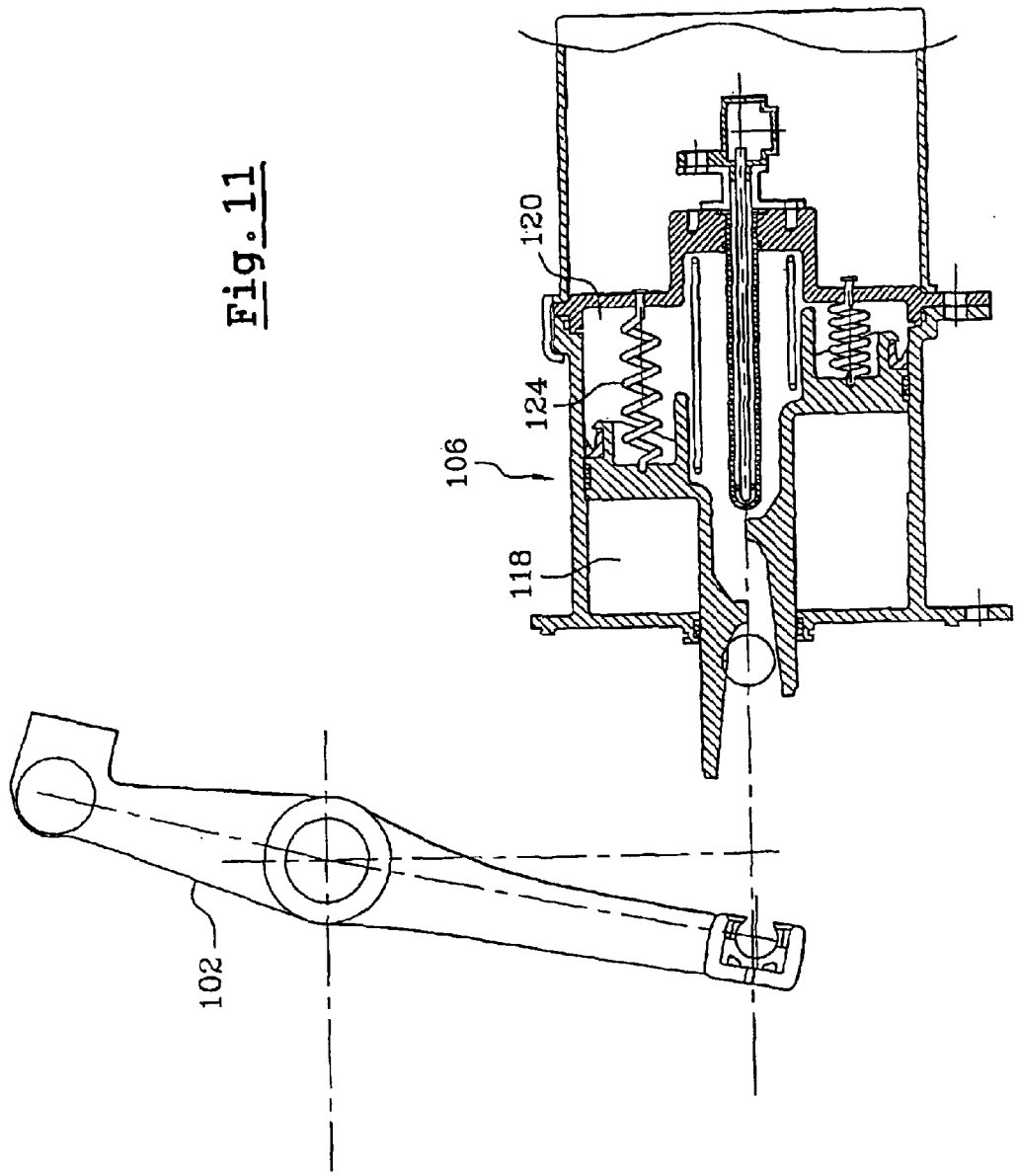

In other embodiments depicted in FIGS. 9 to 11, the clutch release bearing 68 is axially movable by a fork 102 of a conventional type, mounted so as to pivot about a transverse axis 104 on the fixed support 78, this fork 102 itself being driven in movement by a pneumatic actuator 106 of the same type as the actuator 76 which has just been described.

This actuator 106 comprises a fixed cylinder 108 and a piston 110 which is movable with sealing in the cylinder 108 and which is connected to one end 112 of the fork 102 by an appropriate linkage 114.

A position sensor 116 is mounted axially in the cylinder 106 in order to generate a signal representing the axial position of the piston 110 in the cylinder. In the example depicted, this sensor is of the induction type.

In FIG. 9, the implementation corresponds to that of FIG. 3 or 4 and the two chambers 118, 120 of the actuator comprise means (not depicted) for supplying with pressurised gas and also for outflow of gas.

In FIG. 10, the implementation corresponds to that of FIG. 5 or 6, and a chamber 120 of the actuator is connected to means for supplying with gas and for outflow of gas whilst the other chamber 118 of the actuator contains compression springs 122.

In FIG. 11, the implementation corresponds to that of FIG. 7 or 8, the chamber 118 of the actuator being connected to means for supplying with gas and for emptying of gas whilst the chamber 120 contains draw springs 124. The operation of these embodiments is identical to that already described.

Figure 12:
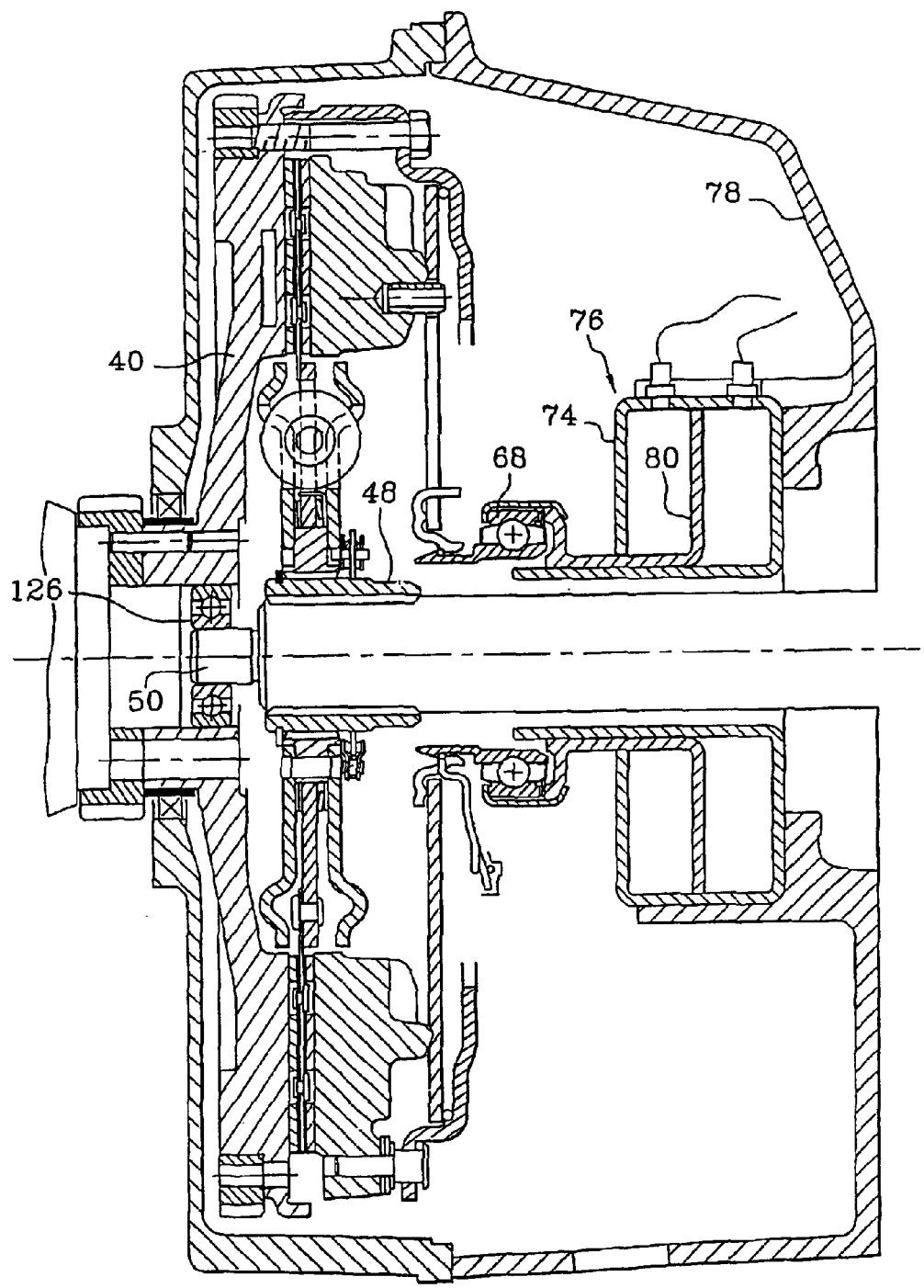

In the variant embodiment of FIG. 12, the device depicted corresponds to that of FIG. 4, the clutch being of the pull type, but the actuator 76 is mounted in a fixed manner on the casing 78 by its cylinder 74 and it is the piston 80 which drives the clutch release bearing 68. The hub 48 of the torsion damper is of a conventional type and is independent of the actuator 76 and of the inertial flywheel 40. The end of the input shaft 50 of the transmission is centred in the flywheel 40 by a pilot bearing 126.

In this embodiment, it is the casing 78 which bears the clutch-disengaging effort transmitted by the actuator 76.

Figure 14:
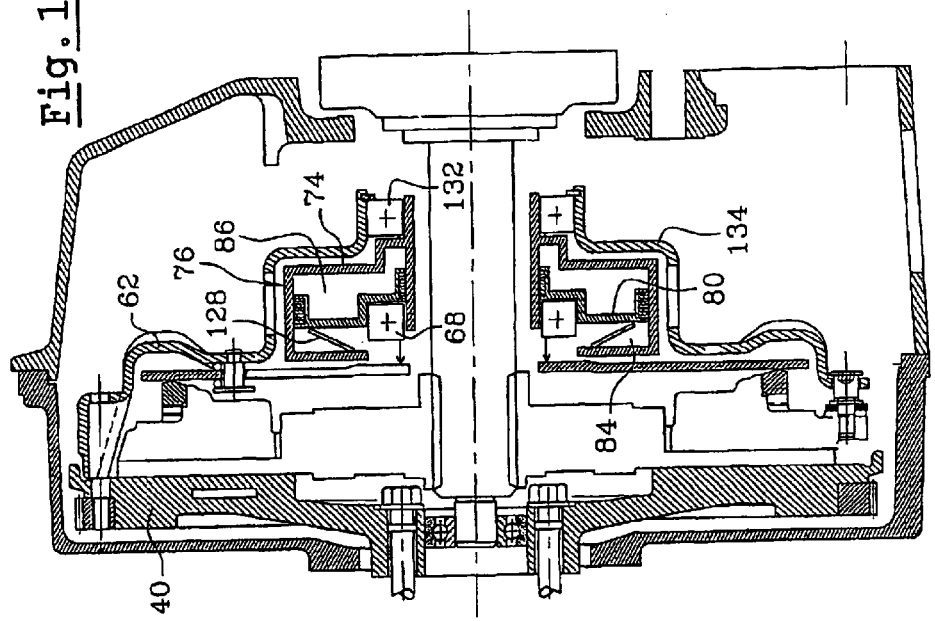
Figure 13:
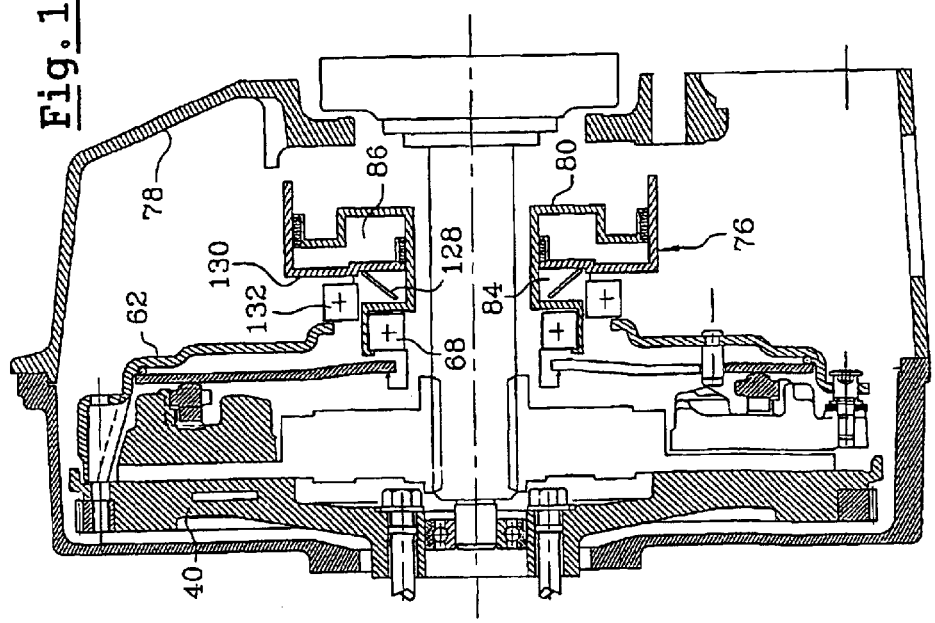

In the variant embodiments of FIGS. 13 and 14, the clutch-disengaging efforts are borne by the cover 62 of the clutch mechanism, this cover being mounted conventionally in a fixed manner by screws or the like on the inertial flywheel 40. In FIG. 13, the actuator 76 is a single-acting actuator, the chamber 86 of which is supplied with pressurised gas, and the chamber 84 of which contains a Belleville washer 128 which opposes a resisting force at the piston 80 of the actuator fixed to the clutch release bearing 68. A radial wall 130 of the cylinder of the actuator extends in the vicinity of the radially internal periphery of the cover 62 and rests on this cover by means of a bearing such as a roller bearing 132. At disengaging of the clutch, the efforts applied at the cylinder of the actuator 76 are borne by the cover 62.

In FIG. 14, the cover 62 comprises, in its radially internal part, an axial lengthening piece 134 in which the actuator 76 is housed. The clutch is of the push type and the clutch release bearing 68 is fixed to the piston 80 of the actuator, the chamber 86 of which comprises means for supplying with pressurised gas and outflow, and the chamber 84 of which contains a Belleville washer 128 opposing the movement of the piston 80 in the clutch-disengaging direction. The cylinder 74 of the actuator rests by means of a bearing such as a roller bearing 132 on the end of the axial lengthening piece 134 of the cover 62, on the side opposite to the engine.

Provision can also be made for the pneumatic actuator 76 to act on the diaphragm 54, by means of a conventional hydraulic control comprising a transmitter providing travel adjustment and a receiver, servo-assisted or not.

When the means generating the resisting force which is added to that developed by the diaphragm during disengaging of the clutch are constituted by a chamber of the pneumatic actuator which is closed in a sealed manner and which is not supplied with pressurised fluid, it can be advantageous to provide at one end of this chamber a breather hole making it possible to connect it to the surrounding atmosphere at the end of clutch-engaging travel in order to compensate for any leaks liable to occur when the gas contained in this chamber is compressed during the clutch-disengaging travel.

In general terms, the invention makes it possible to control with a pneumatic actuator the disengaging of a clutch comprising an annular diaphragm, the characteristic curve of which is concave, in the same way as if the clutch comprised an annular diaphragm with a non-concave characteristic curve, while benefiting from the advantages connected with the use of an annular diaphragm with a concave characteristic curve and a single-acting or double-acting pneumatic actuator.

What is claimed is:

1. Clutch for a motor vehicle, comprising clutch-engaging means (54) suitable for exerting an axial gripping force on a friction disc (44) fixed rotation-wise to a driven shaft (50), clutch-disengaging means comprising a pneumatic actuating device (76) supplied with pressurized gas for exerting on the clutch-engaging means a clutch-disengaging force at least equal to a resisting force developed by these clutch-engaging means, means developing, during disengaging of the clutch, a second resisting force (F) opposite to the clutch-disengaging force and being added to the resisting force developed by the clutch-engaging means (54), the actuating device (76) comprising a cylinder (74), a piston (80) mounted so as to slide in this cylinder and delimiting therein a first chamber (84, 86), a supply of pressurized gas opening into this chamber, means of connecting the piston (80) or the cylinder (74) to the clutch-disengaging means (54), means of connecting the cylinder (74), or the piston (80) respectively, to a fixed support (78), and a second chamber (86, 84) delimited in the cylinder (74) by the piston (80), the means developing said second resisting force being contained in one of the two chambers (84, 86), characterized in that the actuating device (76) carries a clutch release bearing (68) acting on the clutch-engaging means (54) and mounted on a movable part (74) of the actuating device, and in that the actuating device (76) is axially aligned with the clutch-engaging means (54) and is mounted between these clutch-engaging means and a fixed support (78).

2. Clutch according to claim 1, characterized in that the clutch-engaging means (54) have a characteristic load curve which is concave.

3. Clutch according to claim 1, characterized in that the clutch-engaging means comprise an annular diaphragm (54).

4. Clutch according to claim 1, characterized in that the second resisting force is generated by at least one spring means (92, 96).

5. Clutch according to claim 1, characterized in that said second resisting force (F) is produced by compression of a gas in a chamber (84, 86).

6. Clutch according to claim 1, characterized in that the clutch comprises means (18) of controlling said second resisting force (F).

7. Clutch according to claim 6, characterized in that the second resisting force (F) is controlled as a function of the air and engine temperatures and the wear of the friction linings.

8. Clutch according to claim 1, characterized in that the resultant of the two resisting forces has a value which is substantially constant over a second part of the clutch-disengaging travel.

9. Clutch according to claim 1, characterized in that said second chamber (86, 84) contains at least one compression spring (92).

10. Clutch according to claim 1, characterized in that said second chamber (86, 84) is closed in a sealed manner.

11. Clutch according to claim 1, characterized in that said second chamber (86, 84) comprises means (88) of supplying with pressurized gas.

12. Clutch according to claim 1, characterized in that the efforts to which the actuating device (76) is subjected at disengaging of the clutch are transmitted to the fixed support (78).

13. Clutch according to claim 1, characterized in that the efforts to which the actuating device (76) is subjected at disengaging of the clutch are transmitted to a clutch mechanism cover (62) by a bearing (132).

14. Clutch according to claim 1, characterized in that the efforts to which the actuating device (76) is subjected at disengaging of the clutch are transmitted to an inertial flywheel (40) forming a reaction plate of the clutch.

15. Clutch according to claim 14, characterized in that the efforts to which the actuating device (76) is subjected at disengaging of the clutch are transmitted to the inertial flywheel (40) by a cylindrical sleeve (48) fixed rotation-wise to a driven shaft (50).

16. Clutch according to claim 15, characterized in that the cylindrical sleeve (48) also forms the output element of a torsion damping device (46).

17. Clutch according to claim 15, characterized in that the sleeve (48) is connected to the actuating device (76) and the inertial flywheel (40) by roller bearings (83, 89).

18. Clutch according to claim 15, characterized in that the actuating device (76), the clutch mechanism and the cylindrical sleeve (48) form a pre-assembled module.

19. Clutch according to claim 1, characterized in that the actuating device (106) is connected to the clutch-disengaging means by a fork (102) mounted so as to pivot on a fixed support.

20. Clutch according to claim 1, characterized in that said clutch is one of a push and pull type.

21. Clutch for a motor vehicle, comprising: clutch-engaging means (54) suitable for exerting an axial gripping force on a friction disc (44) fixed rotation-wise to a driven shaft (50), clutch-disengaging means comprising a pneumatic actuating device (76) supplied with pressurized gas for exerting on the clutch-engaging means a clutch-disengaging force at least equal to a resisting force developed by these clutch-engaging means, means developing, during disengaging of the clutch, a second resisting force (F) opposite to the clutch-disengaging force and being added to the resisting force developed by the clutch-engaging means (54), the actuating device (76) comprising a cylinder (74), a piston (80) mounted so as to slide in this cylinder and delimiting therein a first chamber (84, 86), a supply of pressurized gas opening into this chamber, means of connecting the piston (80) or the cylinder (74) to the clutch-disengaging means (54), means of connecting the cylinder (74), or the piston (80) respectively, to a fixed support (78), and a second chamber (86, 84) delimited in the cylinder (74) by the piston (80), the means developing said second resisting force being contained in one of the two chambers (84, 86), characterized in that at least one draw spring (96) is housed in said first chamber (84, 86).

22. Clutch, for a motor vehicle, comprising clutch-engaging means (54) suitable for exerting an axial gripping force on a friction disc (44) fixed rotation-wise to a driven shaft (50), clutch-disengaging means comprising a pneumatic actuating device (76) supplied with pressurized gas for exerting on the clutch-engaging means a clutch-disengaging force at least equal to a resisting force developed by these clutch-engaging means, and means developing, during disengaging of the clutch, a second resisting force (f) opposite to the clutch disengaging force and being added to the resisting force developed by the clutch-engaging means (54), wherein the clutch also comprises a mechanism (90) for automatic compensation for the wear of friction linings carried by the friction disc (44) and cooperating with the clutch-engaging means (54) in order to hold clutch start and end positions irrespective of the friction disc wear.

23. Clutch, for a motor vehicle, comprising clutch-engaging means (54) suitable for exerting an axial gripping force on a friction disc (44) fixed rotation-wise to a driven shaft (50), clutch-disengaging means comprising a pneumatic actuating device (76) supplied with pressurized gas for exerting on the clutch-engaging means a clutch-disengaging force at least equal to a resisting force developed by these clutch-engaging means, and means developing, during disengaging of the clutch, a second resisting force (F) opposite to the clutch-disengaging force and being added to the resisting force developed by the clutch-engaging means (54), wherein, during disengaging of the clutch, the means developing a second resisting force act after the start of the disengaging of the clutch when the friction disc is released.

24. Clutch according to claim 23, wherein the second resisting force is generated by at least one spring means.

25. Clutch according to claim 24, wherein the clutch comprising at least one seat (94) for an end of the at least one spring means, a clearance is provided between the said end and the seat.

26. Clutch, for a motor vehicle, comprising clutch-engaging means (54) suitable for exerting an axial gripping force on a friction disc (44) fixed rotation-wise to a driven shaft (50), clutch-disengaging means comprising a pneumatic actuating device (76) supplied with pressurized gas for exerting on the clutch-engaging means a clutch-disengaging force at least equal to a resisting force developed by these clutch-engaging means, and means developing, during disengaging of the clutch, a second resisting force (F) opposite to the clutch-disengaging force and being added to the resisting force developed by the clutch-engaging means (54), wherein, during disengaging of the clutch, the means developing a second resisting force act after the start of the disengaging of the clutch when the friction disc is released, wherein the second resisting force is generated by at least one spring means, and wherein the clutch comprising at least one seat (94) for an end of the at least one spring means, a clearance is provided between the said end and the seat.

* * * * *